United States Patent [19]

Finet

[11] 3,893,078

[45] July 1, 1975

[54] METHOD AND APPARATUS FOR CALCULATING THE CYCLIC CODE OF A BINARY MESSAGE

[75] Inventor: Jean Maurice Finet, Paris, France

[73] Assignee: Honeywell Information Systems Inc., Waltham, Mass.

[22] Filed: Apr. 8, 1974

[21] Appl. No.: 458,922

[30] Foreign Application Priority Data

Apr. 13, 1973 France .............................. 73.13501

[52] U.S. Cl. ........................................ 340/146.1 AL
[51] Int. Cl.² ........................................ G06F 11/12
[58] Field of Search .......... 340/146.1 AL, 146.1 AQ

[56] References Cited

UNITED STATES PATENTS

| | | | |
|---|---|---|---|
| 3,805,232 | 4/1974 | Van Allen | 340/146.1 AL |
| 3,821,703 | 6/1974 | Devore et al. | 340/146.1 AL |

OTHER PUBLICATIONS

Cyclic Redundancy Check Using Table-Look-Up, IBM Technical Disclosure Bulletin, Vol. 13, No. 11, April 1971, pp. 3524–3526.

*Primary Examiner*—Charles E. Atkinson
*Attorney, Agent, or Firm*—Ronald T. Reiling; David A. Frank

[57] ABSTRACT

In generating cyclic codes for binary messages used in systems for processing and transmitting data, apparatus and method for calculating the cyclic code from the generating polynomial when the incoming message of $n$ binary information elements is split into a whole number $s$ of words each containing $q$ binary information elements, in such a way that the relationship $n = sq + r$ is satisfied, with $r$ being zero when q is a sub-multiple of $n$, and being a whole number other than zero and less than $q$ when $q$ is not a sub-multiple of $n$. In a first form of the method, the cyclic code is generated piece by piece by combining the cyclic codes for each of the $s$ words and the residue. In a second form of the method, the cyclic codes for each of the $s$ words are first generated and placed into a memory table for later use.

12 Claims, 7 Drawing Figures

TABLE CALCULATING APPARATUS

METHOD AND APPARATUS FOR CALCULATING THE CYCLIC CODE OF A BINARY MESSAGE

BACKGROUND OF THE INVENTION

1. Field of Use

The present invention relates to a method and apparatus for calculating the cyclic code of a binary message; they may be used in systems for processing and transmitting data and they make it possible to check for errors which may be introduced while a message is being transmitted, these errors being due to noise on the transmission line.

2. Description of the Prior Art

It is necessary to describe briefly the theory of cyclic codes and the relevant state of the art in order that the objects of the invention may be better understood.

If a message containing $n$ binary information elements is considered, these elements may be looked upon as the coefficients of a polynomial function I of a variable X. The function is referred to as I(X) and may be written out as:

$$I(X) = A_{n-1} X^{n-1} + A_{n-2} X^{n-2} + \ldots + A_1 X + A_0.$$

Thus, for example, the message 1 0 1 0 0 1 0 1 may be represented by the polynomial $X^7 + X^5 + X^2 + 1$ in modulo 2 algebra. I (X) is of a degree lower than or equal to n-1, and $A_{n-1}$ is the first element transmitted or received.

A k degree polynomial G(X) exists which is termed the generating polynomial for the cyclic code and which can be written out as:

$$G(X) = X^k + G_{k-1} X^{k-1} + \ldots + G_1 x + G_0.$$

The cyclic code is the continuation of the binary elements formed by the coefficients of the remainder C(X) after a "modulo 2" division of the polynomial $X^k$. I(X) by the generating polynomial G(X), and this being so:

$$X^k . I(X) = Q(X) . G(X) \oplus C(X),$$

where Q(X) represents the quotient resulting from dividing $X^k$. I (X) by G(X), the sign $\oplus$ being the "modulo 2" addition sign and C(X) being of a degree lower than or equal to k-1.

Bearing in mind that under the modulo 2 addition rule, $C(X) \oplus C(X) = O$, it is possible to write:

$$X^k.T(X) \oplus C(X) = Q(X) . G(X).$$

The result is that the block formed by the $n$ binary information elements in the message, followed by the $k$ binary check elements in the cyclic code is divisible by the generating polynomial, Q(X) being the quotient.

On transmission, the binary information elements in the message are subjected to a coding process which is equivalent to division by the generating polynomial after multiplication by X. The remainder is transmitted along the line immediately after the binary information elements, in the decreasing order of its terms.

At reception, the complete block is subjected to a decoding process which is equivalent to division by the generating polynomial; where there is no error, this division leaves no remainder, while the existence of a remainder other than O implies the existence of an error. Another method consists in applying the coding process only to the information elements, that is to say to the first $n$ binary elements received and in comparing the next $k$ binary elements received with a value calculated for them. Any difference between these two values indicates the existence of an error.

The way in which the generating polynomial G (X) is selected will not be discussed since this is described in a number of works.

The result is that both coding and decoding may be reduced to a matter of dividing a polynomial representing the message by a polynomial which generates the cyclic code using a modulo 2 addition rule.

This division is easily accomplished, as shown by the followng example:

```
1x^7 + ox^6 + 1x^5 + ox^4 + ox^3 + 1x^2 + ox + 1  | 1x^3+ox^2+1x+1
1x^7 + ox^6 + 1x^5 + 1x^4 + ox^3 + ox^2 + ox + o  | x^4 + x
                     1x^4 + ox^3 + 1x^2 + ox + 1  |
                     1x^4 + ox^3 + 1x^2 + 1x + o  |
                                          1x + 1  |
```

To simplify matters, the division process may be shown solely with the coefficients without bothering about the unused quotient.

```
1 0 1 0 0 1 0 1 | 1 0 1 1
1 0 1 1         |
      1 0 1 0 1 |
      1 0 1 1   |
            1 1 |
```

The procedure governing the division process is as follows:

The highest degree terms in the dividend and divisor are brought into line and then all the terms in the same column are subtracted, which is equivalent in modulo 2 algebra where $1 \oplus 1 = 0$, to adding the terms in question.

The operation is repeated with the result of the subtraction until a partial dividend is obtained which is of a lower degree than the divisor.

Examining the operations in question will show that they may be carried out by means of a succession of modulo 2 additions.

Known apparatus for calculating the cyclic code of a message incorporates adders in series with the locations of a feedback shift register, with the number of such adders of the "EXCLUSIVE OR" type and their position in relation to the locations of the register depending on the form of the generating polynomial, each binary element in the message to be coded being fed into the shift register at each stage of the calculation. An apparatus of this type is described in the "White Book" of the International Consultative Committee on Telegraphy and Telephony — volume VIII — note v41, pages 11, 12, 13.

It is known to split up this message of n binary elements into words of a predetermined length each of which contains a plurality of binary elements ($q$ binary element) of the message: the cyclic code is then worked out word by word, providing that splitting up the message produces an exact number of words, that is to say that $n$ is a multiple of $q$.

OBJECTS

The present invention has an object to overcome this restriction and to enable a cyclic code to be calculated for a message of any length whatever (i.e. $n$ may or may not be a multiple of $q$).

SUMMARY OF THE INVENTION

The present invention relates firstly to a method of calculating the cyclic code of a message containing any number $n$ of binary information elements, this method comprising a stage of splitting up the message into a whole number $s$ of words containing $q$ binary information elements plus a residue of $r$ binary information elements, in such a away that the relationship $n = sq + r$ is satisfied, with $r$ being zero when $q$ is a sub-multiple of $n$, and being a whole number other than zero and less than $q$ when $q$ is not a sub-multiple of $n$.

The method also comprises a stage of calculating the cyclic code of the message which has been split up in this way and it is characterized by the fact that the said calculating stage for the split-up message comprises:

1. a phase consisting in having the cyclic code for the group of words calculated word by word by a calculating unit, the code beng constructed and fed successively into a shift register.

2. a phase consisting in checking for the existence of the said residue, at the conclusion of which:

a. the check is negative when there is no residue and the cyclic code of the message is then contained in the shift register.

b. the check is positive when there is a residue, and this causes the said calculator unit to begin an operation to calculate the cyclic code of the group formed by said words and said residue, that is to say the cyclic code of the message, this cyclic code being then contained in said shift register.

The present invention has a further object to provide an apparatus for calculating the cyclic code of a message which may contain any number $n$ of binary information elements, this apparatus employing the method which has just been described and comprising:

1. Means for splitting up the message into a whole number S of words, each of which contains $q$ binary information elements plus a residue of $r$ information elements such that the relationship $n = sq + r$ is satisfied, with $r$ being zero when $q$ is a submultiple of $n$ and being a whole number other than zero but less than $q$ when $q$ is not a sub-multiple of $n$.

2. A shift register into which the code for the message is fed.

3. Calculating means connected to the outputs of said splitting means and to the outputs and inputs of the shift register, which enables the cyclic code of the split-up message to be calculated.

This apparatus is characterized by the fact that the said calculating means comprise:

1. A first system for calculating the cyclic code of all said words, word by word, this system being connected to the outputs and inputs of the shift register.

2. Means which, in conjunction with said splitting means, enable the existence of said residue to be checked, these means supplying:

a. either a negative check signal when there is no residue, the cyclic code for all said words being then contained in said shift register.

b. or a positive check signal when there is a residue, this signal actuating a second system for calculating the cyclic code for the group formed by said words and said residue, this second calculating unit being connected to the outputs of the said splitting means and to the outputs and inputs of said shift register.

BRIEF DESCRIPTION OF THE DRAWINGS

Other objects, features and advantages of the invention will be better understood from the following description of preferred embodiments, which is given with reference to the accompanying drawings, in which.

DESCRIPTION OF THE PREFERRED EMBODIMENT

Detailed Description of the Figures

Figure 1:
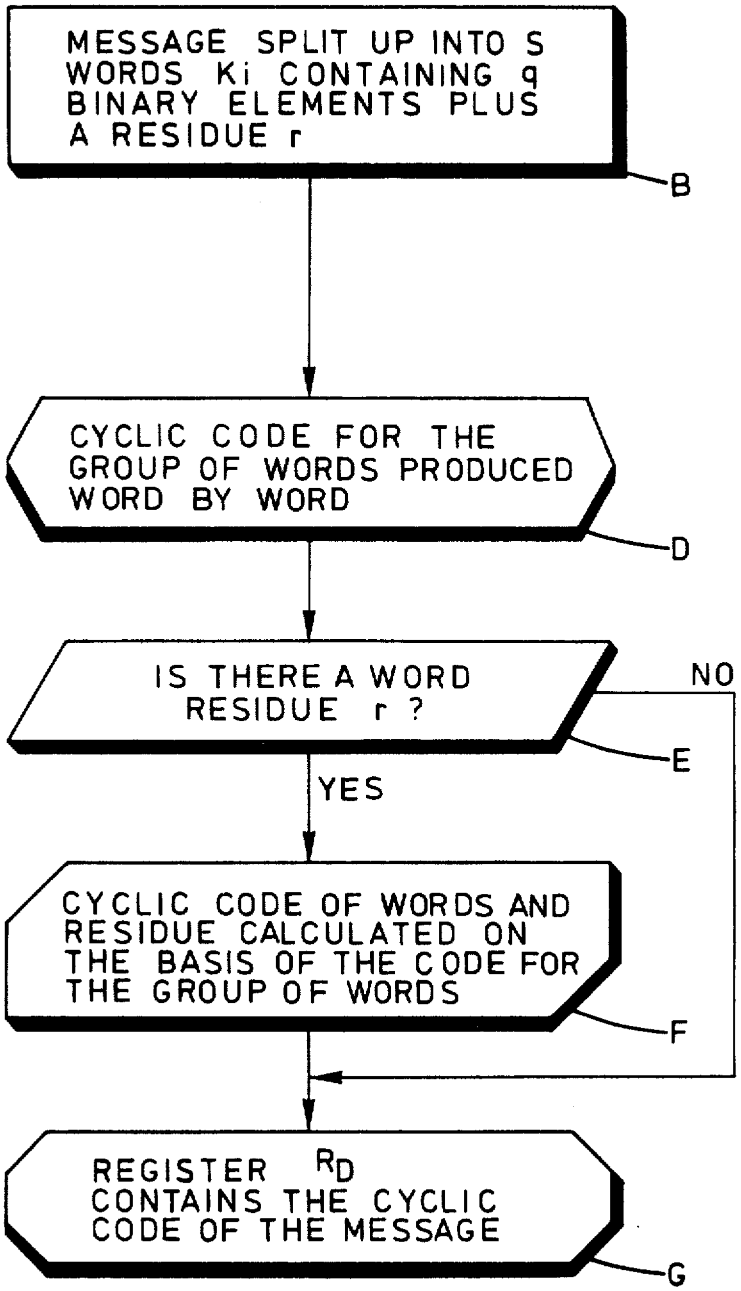
FIG. 1 shows the principle stages of the method of calculating a cyclic code according to the invention.

The main operations of the method which, in accordance with the invention, enables the cyclic code of a message to be calculated are shown in FIG. 1. First of all, at B, the message is split up into s words Ki each of which contains $q$ binary information items, plus a residue of $r$ binary elements.

These words are next fed in succession to a shift register at D, and are then processed one by one in order to obtain the cyclic code of the group which they form. It is then necessary to discover at E if splitting up the message has produced a word residue $r$, which is the case when $n$ is not a multiple of $q$.

If the reply to the question posed at E is "YES," the cyclic code of the message is then calculated at F on the basis of the cyclic code for the group of words, taking into account the residue $r$. At the end G of these operations, the shift register contains the cyclic code of the message. On the other hand, if the reply to the question at E is "NO," it is possible to state straightaway at G that the shift register contains the cyclic code of the message without carrying out operation F.

Figure 2:
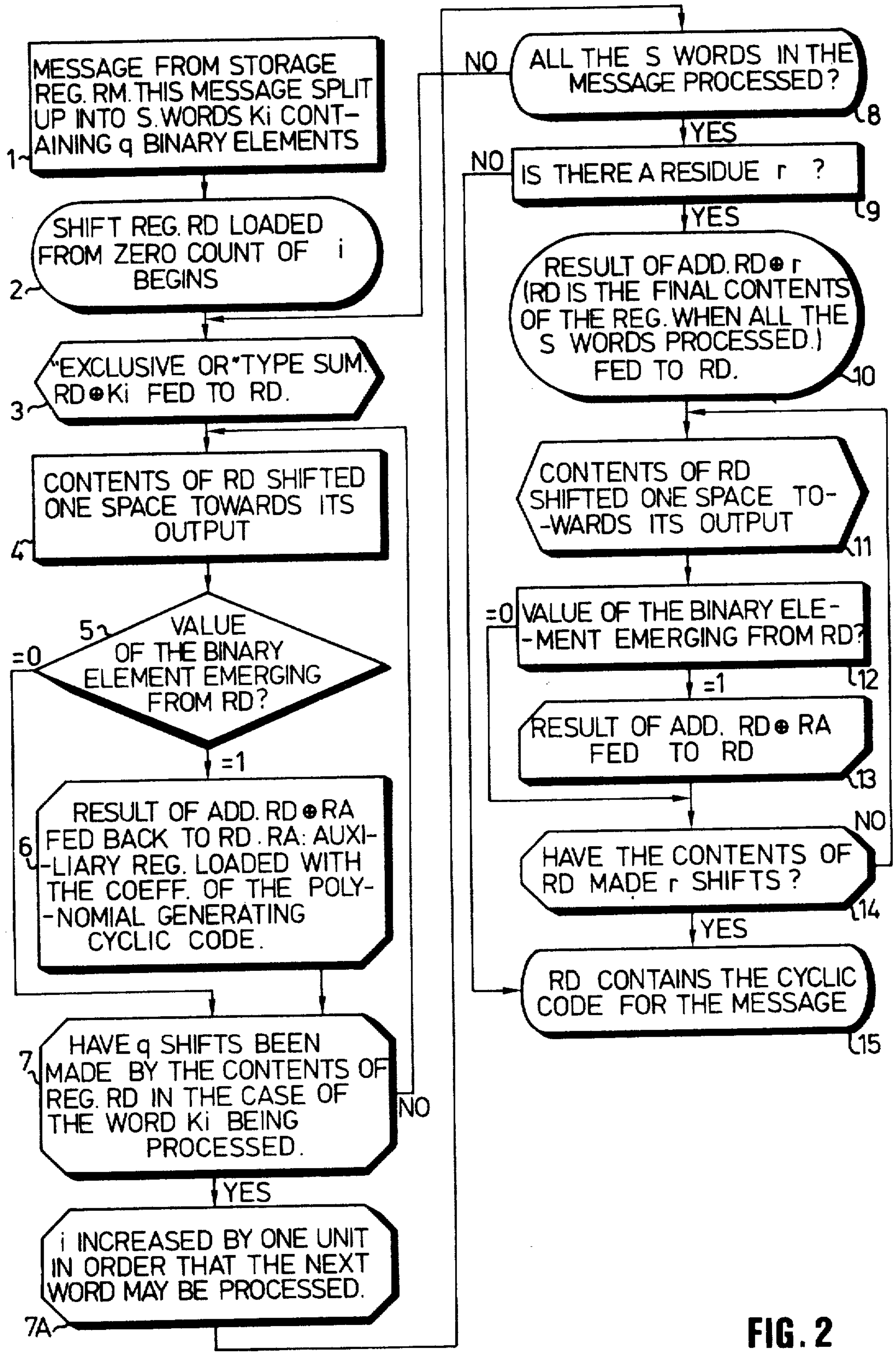
FIG. 2 shows a first form of the method of calculating a cyclic code described in the present application.

A first modification of the calculating method, which is shown in FIG. 2, comprises a first stage 1 during which the message made up of $n$ binary elements for which is desired to calculate the cyclic code, is split up into a whole number s of words each of which contains $q$ binary information elements, plus a residue of $r$ binary information elements, this message originating from a storage register RM for example. The splitting up operation begins with the first binary element transmitted.

The relationship which then exists between $n$, $s$ and $q$ takes the form : $n = sq + r$.

The number $r$ is equal to zero if the number $q$ of binary elements constituting each word Ki of the message is a sub-multiple of the number $n$ of information items contained in the message and is a number other than zero but less than the number $q$ of items in a word when $q$ is not a sub-multiple of $n$.

Splitting up the message is followed by the setting to zero of a shift register $R_D$, and by commencing a count of the position $i$ of the words which are introduced successively in the register.

The capacity of register $R_D$ is at least equal to the number of coefficients of which the polynomial used to generate the cyclic code consists less one unit, and the register will be used to contain the successive words in the message and for calculating the cyclic code of the message word by word.

The method illustrated by FIG. 2 then involves a series of operations 3, 4, 5, 6, 7, 7A and 8 which will be examined in greater detail below and which form a stage in which a cyclic code is calculated for the group of words forming the message, which words are fed successively into the shift register RD. Phase 9 consists in determining whether the number $n$ of binary elements forming the split-up message in a multiple of the number $q$ of binary elements in each word, or in other words in checking whether there is a word residue $r$ at the end of the split-up message. If the answer to this question is "NO," direct confirmation can be made at 15 that, following the preceding operations which consisted in calculating the cyclic code of the whole group of words, the shift register now contains a cyclic code for the message. If, on the other hand, the reply is "YES," it is then necessary to carry out additional calculating operations marked 10, 11, 12, 13, and 14 in order to complete the process of calculating the cyclic code of the message by taking account of the existence of a word residue resulting from the splitting-up operation.

Operations 3 to 8, which enable the cyclic code of the group of words forming the message to be calculated, will now be examined in greater detail.

After the shift register has been set to zero, in the operation marked 3 the register has fed into it the binary elements which result from an "EXCLUSIVE OR" type of summing operation, marked ⊕ , the values summed being its previous content, i.e., O, and the binary elements representing the first word $K_i$ of the message. This word is shifted towards the output of the shift register, the first binary element to be transmitted being the first element at the output end of the register.

After the shift register has been loaded in this way, an operation 4 takes place which consists in subjecting the contents of the register to a shift by one space towards the output of the register by feeding the binary value O to its input.

After this shift, an operation 5 takes place to determine the value of the binary element emerging from register RD, which value may be 0 or 1. If the value in question is 1, the shift register has fed back to it binary elements resulting from an "EXCLUSIVE OR" type summation 6 between the content of register $R_D$ after the shift and the binary elements representing the coefficients of the polynomial used to generate the cyclic code of the message, which are contained in an auxiliary register $R_A$. These coefficients are stored in descending order ($G_{k-2}$. . .$G_1$,$G_0$) beginning from the side of the register corresponding to the output of $R_D$.

After this summing operation, there is a checking operation 7 which consists in determining the number of shifts undergone by the content of register $R_D$. When the binary element which is output from the register after the shift operation is zero, this operation takes place straightaway without operation 6 intervening. If the contents of the register have not made $q$ shifts, the outcome of the checking operation 7 is "NO" and the cycle of operations 3 to 8 is then repeated as before.

When $q$ successive shifts of the contents of register $R_D$ have been made in the case of the word being processed, the outcome of check 7 will be "YES" and it is then necessary to increase the value $i$ by one unit, this operation being marked 7A and allowing a change-over to be made to the next word. Operation 7A is followed by a check 8 on the number of words which have been processed.

If the outcome of this check is NO, or in other words, if all the s words in the message have not been processed, it is necessary to repeat the preceding operations 3 to 8 with the next word $K_2$ and so on, until the last word $K_S$.

Operation 3, which, in the case of the first word, was equivalent to feeding into $R_D$ the binary elements representing this first word, will consist, in the case of subsequent words, in feeding into the register in question the result of the EXCLUSIVE OR type summation between the previous content of the shift register after the word before had been processed and the binary elements representing the following word. This is the summing operation which is marked $R_D \oplus K_i$ in FIG. 1 and the shift applied is the same as that described above.

The operations 10 to 14 which enable a cyclic code to be calculated for a message of which a residue remains after the splitting-up operation, will now be examined in greater detail:

The calculating operation is based on the cyclic code for the group of words, which is contained in shift register $R_D$ at the conclusion of operation 8. Operation 10 consists in feeding into shift register $R_D$ the binary elements resulting from an EXCLUSIVE OR type summation between the final contents of shift register $R_D$, i.e., the cyclic code for the group of s words, and the binary elements representing the residue.

Then, in operation 11, the new contents of register $R_D$ are shifted one space towards its output and then, at 12, the value of the binary element emerging from this register, which may be 0 or 1, is determined. If the value in question is 1, the shift register $R_D$ again has fed into it, at stage 13, binary elements resulting from an EXCLUSIVE OR type summation between the elements which it previously contained at the conclusion of operation 11 and binary elements representing the polynomial for generating the cyclic code, which are contained in an auxiliary register $R_A$. This summation is followed by operation 14 in which the number of shifts undergone by the contents of register $R_D$ is checked. If the result of the check is negative, i.e., if $r$ shifts have not take place, the cycle of operations 11 to 14 is repeated until the requisite number $r$ of shifts has been achieved, following which it becomes possible to state, at 15, that the cyclic code for the whole message is contained in the shift register.

If, in the course of operation 12, the value of the binary elements emerging from the shift register is 0, operation 13, which calls into play the generating polynomial, is not carried out and operation 14 takes place immediately after operation 12.

Figure 3:
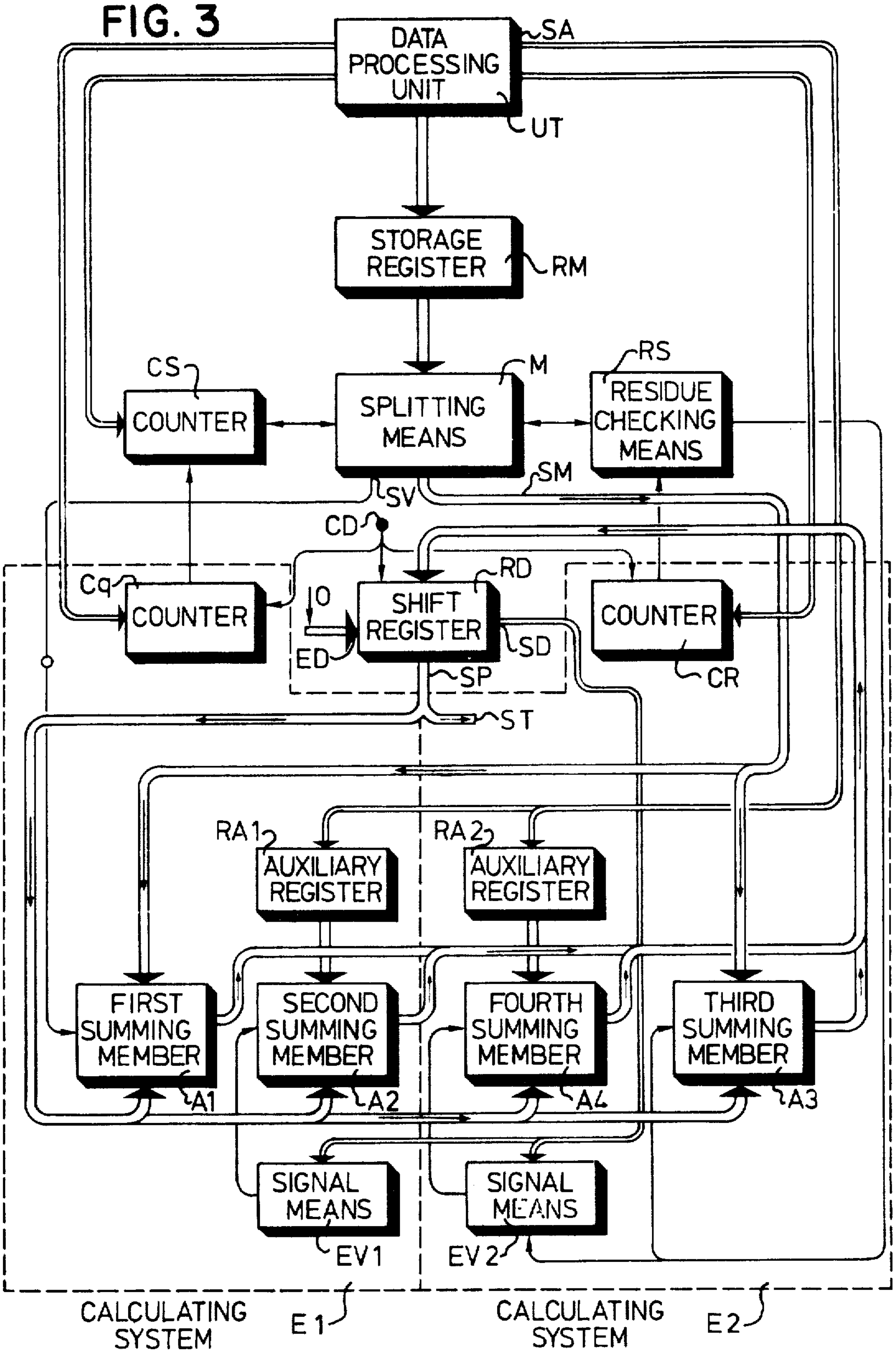
FIG. 3 is a diagram of the apparatus which enables the method illustrated in FIG. 2 to be put into effect.

The apparatus which enables the method just described to be put into effect is shown in FIG. 3.

In this Figure can be seen a storage register $R_M$, in which a message originating from a data-processing unit UT is recorded prior to the message being split up into words and a word-residue by splitting means M which employ a counter Cs which is moved up by the processing unit UT to a value S corresponding to the number of words in the message, and a counter Cr which is moved up to a value *r* corresponding to the residue. In this Figure may also be seen a shift register $R_D$, the shift output of which is marked $S_D$ and the shift input of which is marked $E_D$.

The means which enable operations 3 to 8 in the method described above to be carried out, and which enable the cyclic code for the group of words in the message to be calculated word by word, are represented by a calculating system $E_1$, while the means which enable the cyclic code for the group of *s* words plus the residue to be calculated are shown by a calculating system $E_2$. The existence of such a residue is detected by means $R_S$ for checking for the existence of a residue, these means being connected to one output of the splitting means M and to counter Cr for example. The checking means supply a negative check signal when there is no residue and a positive check signal which actuates calculating system $E_2$ when there is a residue.

The system $E_1$ for calculating the cyclic code of the group of words contains a counter Cq, which may be controlled by processing unit UT. The counter in question is set to the value *q* at the beginning of each word in the message and it allows note to be taken of the *q* successive shifts made by the content of register $R_D$, a zero being fed to input $E_D$ of the register each time a shift takes place. The counter, which is connected at one output to counter Cs, comes into action each time a word of the message comes from the splitting means M and is decremented by one unit each time a clock pulse arrives at register $R_D$ at $C_D$ and causes a shift.

A first summing member $A_1$, which is connected on the one hand to the outputs of the splitting means M and on the other hand to the parallel outputs Sp of the shift register, enables the binary elements resulting from an EXCLUSIVE OR type summation between the elements forming the cyclic code of the word which has just been processed and the elements for the following word, to be fed back to the shift register. The summater may be validated at the beginning of each word by means of a signal supplied by an output $S_F$ of the splitting means M.

The calculating means $E_1$ also include an auxiliary register $R_{A1}$ which contains the binary elements representing the polynomial for generating the cyclic code of the message, which are fed in initially by the processing unit UT from an output $S_A$. A second summing member $A_2$, which is connected on the one hand to the parallel outputs of an auxiliary register $R_{A1}$ and on the other hand to the output $S_P$ of the shift register, enables the binary elements resulting from an EXCLUSIVE OR type summation between the binary elements contained in the shift register and the binary elements representing the polynomial gor generating the cyclic code of the message, which are contained in register $RA_1$, to be fed back to the shift register. This second summater receives a validating or invalidating signal from means $EV_1$ which evaluate the value of the binary element which appears at the series output $S_D$ of register $R_D$. After each shift, when means $EV_1$ have received a binary element equal to 1, they supply a validating signal, whereas if the binary element is equal to 0 they supply an invalidating signal.

The means $E_2$ for calculating the cyclic code of the group formed by the words and the residue contain a third summing member $A_3$, which is connected on the one hand to the parallel outputs $S_p$ of the shift register $R_D$ and on the other hand to the outputs $S_M$ of the splitting means M. They enable the binary elements resulting from an EXCLUSIVE OR type summation between the binary elements representing the cyclic code for the group of words and the binary elements representing the residue to be fed back to the shift register. This third summater may be validated by a positive check signal originating from one output of the means $R_S$ which check for the existence of a residue, validation taking place at the moment when the process of calculating the cyclic code for the group of words is concluded and then only if a residue does exist. In the opposite case this third summater is invalidated by a negative check signal during the whole of the period when the cyclic code for the group of words is being calculated.

These calculating means $E_2$ also include means to subject the contents of register $R_D$ to *r* successive shifts. A counter $C_r$, which is set initially to a value *r* by processing unit UT, counts the *r* shifts made by the contents of register $R_D$ when a zero is fed into input $E_D$ of the register and when a clock pulse causing a shift arrives at $R_D$ from $C_D$. After each of the *r* shifts, the binary element emerging from $R_D$ is evaluated by means $EV_2$, which, when the binary element is 1, supply a validating signal, whereas if the element is O, they supply an invalidating signal. These signal means $EV_2$ may be activated by a signal originating from checking means $R_S$, beginning from the time when a residue is detected.

The validating signal controls a fourth summing member $A_4$, which is connected on the one hand to the parallel outputs $S_p$ of the shift register and on the other hand to the parallel outputs of a further auxiliary register $RA_2$ into which are fed the binary elements representing the polynomial generator for the message. This fourth summater enables the binary elements resulting from an EXCLUSIVE OR type summation between the elements contained in the register $R_D$ after a shift and the elements contained in register $RA_2$ to be fed back to register $R_D$.

After the contents of $R_D$ have been subjected to *r* shifts, the register in question contains the cyclic code for the whole message and this code is available at the outputs $S_T$ of the shift register which branch from outputs $S_p$.

It will be noted that registers $RA_1$, $RA_2$, and $R_D$, although they contain the same number of locations, have been shown differently in the Figure for ease of representation.

Figure 4:
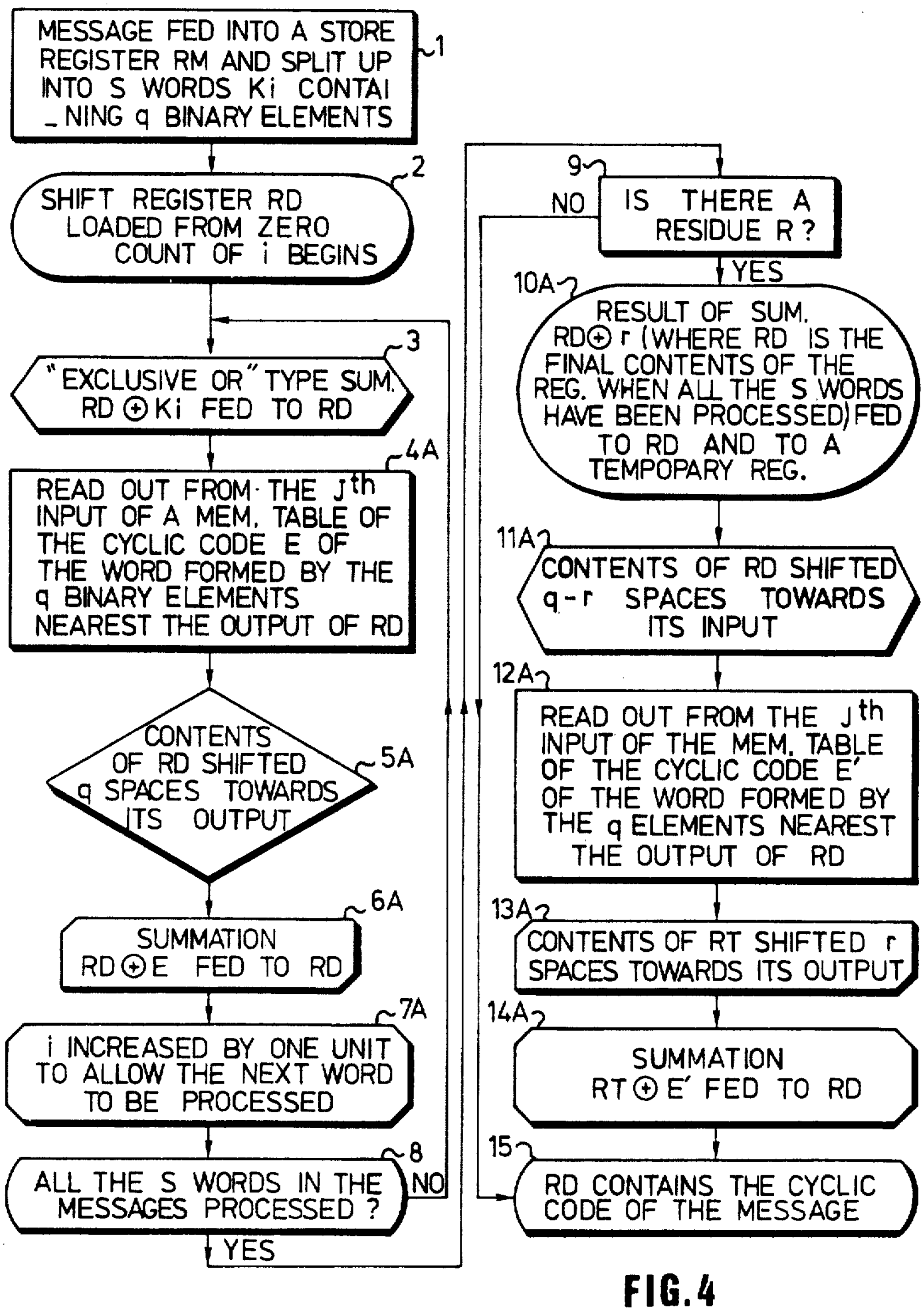
FIG. 4 is a second form of the method of calculating a cyclic code, which employs a memory table.

Another form of the method for calculating the cyclic code of a message is shown in FIG. 4 in which operations 1, 2, 3, 7A, 8, 9 and 15 are identical to those described in the case of the first form of the method, which was illustrated by FIG. 2.

The first operation to be described will be 4A which, by a read-out from the $J^{th}$ number input of a memory table, enables the cyclic code E of the word formed by the $q$ binary elements contained in the shift register to be ascertained, these binary elements being those located nearest the output of the shift register and resulting from an EXCLUSIVE OR type summation between its previous content and the elements representing the word being processed in the message as split up. Value J is determined by the q binary items and observes the relationship:

$$O \leq J \leq 2^{q-1}$$

Details of the way in which this table is generated will be given below.

The operation 5A which follows this read-out from the table consists in shifting the new contents of register $R_D$ towards its output by $q$ spaces, and it is followed by an operation 6A which consists in feeding the binary elements resulting from an EXCLUSIVE OR summation between the binary elements contained in the register after it has been moved up by $q$ spaces and the binary elements forming the cyclic code E read out from the table, into register $R_D$.

It is then necessary to find the number S of words Ki which have been processed and, if this number has not been reached, to move on to the next word. The operation marked 7A is that which enables a transition to be made from work $ki$ to word ki+1. Operations 3, $4_A$, $5_A$, $6_A$, $7_A$ are then repeated in the same way until all the S words have been processed.

When all the s words in the message has been processed, the outcome of the check operation 8 is YES and a check 9 is then made for the existance of any residue $r$ which might result from the operation of splitting up the message. If the outcome of this check 9 is negative, that is to say if there is no residue, the process may be halted forthwith at operation 15, without going through the intermediate stages $10_A$, $11_A$, $12_A$, $13_A$, $14_A$, and the shift register then contains the cyclic code of the message.

If on the other hand the outcome of check 9 is YES, a residue exists and operataions 10A to 14A will enable the cyclic code for the message and its residue after splitting up to be calculated, this calculation being performed on the basis of the cyclic code for the group of words, which has been contained in shift register $R_D$ since the conclusion of operation 8.

Operation 10A consists in feeding the binary elements resulting from an EXCLUSIVE OR type summation between the binary elements representing the cyclic code for the group of words contained in register $R_D$ and the elements representing the residue, into register $R_D$ and a temporary register $R_T$.

The next operation 11A, consists in shifting the contents of shift register $R_D$ towards the input of the register in question by a number of spaces equal to $q - r$, with $q - r$ zeros being fed into the output of $R_D$. After this, there is a stage 12A which consists in reading out from $j^{th}$ input of a memory table the cyclic code E' for the word formed by the $q$ binary element nearest the output of $R_D$, which are formed on the basis of the residue.

This table is the same as that mentioned above and the way in which it is produced will be described below.

The contents of register $R_T$, which have not been altered since operation 10A, are then shifted by $r$ spaces towards the output of the register in the course of operation 13A.

Finally, an operation 14A is carried out which consists in feeding into $R_D$ the binary elements resulting from an EXCLUSIVE OR summation between elements contained in $R_T$ and $r$ shifts and the binary elements forming the cyclic code E' supplied by the table. The conclusion of the process of calculating the cyclic code is seen at 15, and the shift register $R_D$ then contains the cyclic code for the whole message.

Figure 5:
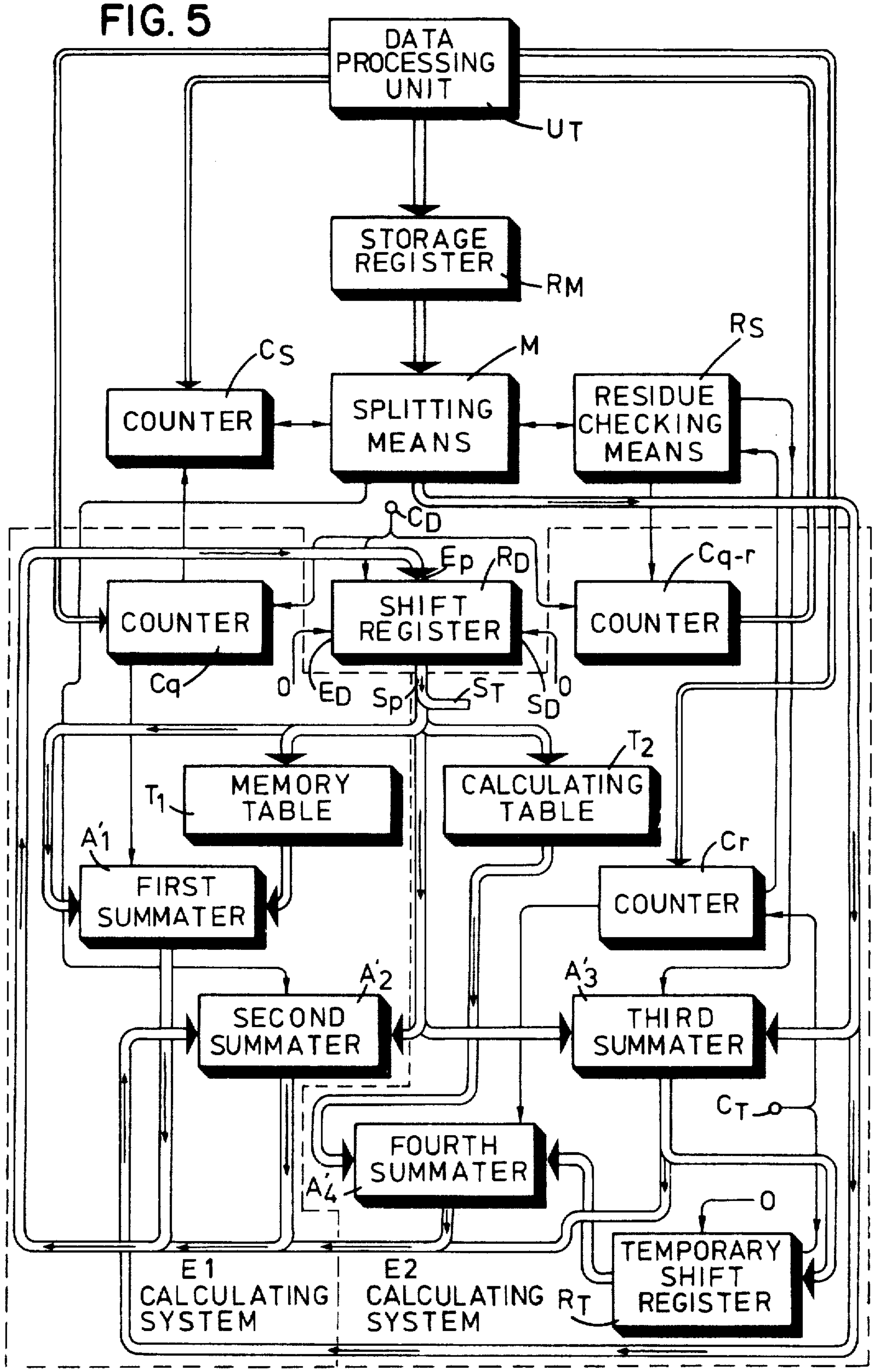
FIG. 5 is a diagram of an apparatus which enables the method illustrated in FIG. 4 to be put into effect.

The apparatus which enables this second form of the method of calculating a cyclic code which has just been described to be put into effect is shown in FIG. 5. As in FIG. 3, there is seen in this Figure a storage register $R_M$ in which is recorded a message originating from the dataprocessing unit UT. This message is then split up into words and word residue by splitting means M which are controlled via one input by a counter $C_S$ which is set to a value S corresponding to the number of words in the message and via another input by a counter Cr which is set to a value $r$ corresponding to the residue. Also to be seen in this Figure is the shift register $R_D$ the series shift output of which is marked $S_D$ and the shift input of which is marked $E_D$. The system for calculating the cyclic code of the group of words is shown at $E_1$ while the system which enables the cyclic code for the words and the residue to be calculated is shown at $E_2$. The existence of the residue in question is detected by residue checking means $R_S$ which may be connected to one output of the splitting means M.

As before, these checking means supply a negative check signal when there is no residue and a positive check signal which actuates system $E_2$ when there is a residue.

The system $E_1$ for calculating the cyclic code of the group of words contains a memory table $T_1$ which gives the cyclic code E for all the words consisting of $q$ binary elements which may be contained in the register.

It alaso contains means formed by a counter Cq which is set to a value $q$ for example, and which, in the case of each word, enables note to be taken of the shift of the contents of $R_D$ by $q$ spaces towards the series shift output $S_D$ of the register in the course of processing. This shift is caused by clock pulses which arrive at counter Cq at CD and at shift register $R_D$, a zero being fed to the input of $R_D$ each time a shift takes place.

The operation 6A of feeding into $R_D$ the binary elements resulting from an EXCLUSIVE OR type summation between the elements contained in $R_D$ after the shifts and the elements forming cyclic code E is carried out by means of a first summater $A'_1$, which is connected on the one hand to the outputs of table $T_1$ and on the other hand to the outputs of $R_D$. This first summater may be validated by a signal from counter Cq each time $q$ shifts have been made by the contents of $R_D$. Also to be seen in the Figure is a second summater $A'_2$ which, so long as all the words are as yet unprocessed, allows the binary items resulting from the EXCLUSIVE OR type summation between the previous contents of RD for the word being processed and the binary element representing the word following the word being processed to be fed back to $R_D$. This second adder, which is connected on the one hand to the outputs of the shift register and on the other hand to the outputs of the splitting means M, may be validated by a signal from M when each word begins to be processed.

The calculating system $E_2$ which enables the cyclic code for the group formed by the words and the residue to be calculated, contains a third summater $A'_3$ which is connected on the one hand to the outputs of the splitting means M and on the other hand to the parallel outputs $S_p$ of shift register $R_D$. The outputs of this third summater are connected to the parallel inputs $E_p$ of register $R_D$ and it is this third summater which enables operation 10A in FIG. 3 to be carried out, this operation consisting in feeding back to $R_D$ the binary elements resulting from the EXCLUSIVE OR type summation between the binary elements contained in register $R_D$, which represent the cyclic code for the group of words, and the binary elements representing the residue.

This third summater may be validated by a signal which is supplied by the checking means as soon as a residue has been detected.

The calculating system $E_2$ also contains a temporary shift register $R_T$ which is connected to the outputs of summater $A'_3$ and to which are fed the binary element resulting from the preceding summation carried out by $A'_3$. Means Cr, which are formed for example by a counter controlled by processing unit UT, enable note to be taken of the $r$ shifts undergone by the contents of register $R_T$ towards its output. Each shift is caused by a pulse which reaches register $R_t$ and counter $C_r$ (at $C_T$), while at the same time a zero is fed to the input of this register.

A calculating table $T_2$ is connected to the outputs of the shift register and it supplies the cyclic code $E'_t$ for the contents of this register subsequent to the preceding summing operation, while the counting means $Cq\text{-}r$, which are connected to output $S_D$ of shift register $R_D$ and which are formed by a counter, enable note to be taken of the $q\text{-}r$ shifts undergone by the contents of register $R_D$ towards its input, before table $T_2$ is read, each shift being caused by feeding a zero binary element to output $S_D$ of register $R_D$.

Finally, a fourth summater at $A'_4$, the inputs of which are connected on the one hand to the outputs of the temporary register and on the other hand to the outputs of table $T_2$, enable the binary elements representing the cyclic code for the complete message to be fed back to register $R_D$. This fourth summater may be validated by an output signal from counter Cr after the latter has taken account of the $r$ shifts made by the content of $R_T$. The cyclic code is then available at the outputs $S_T$ of the shift register which branch from Sp.

Figure 6:
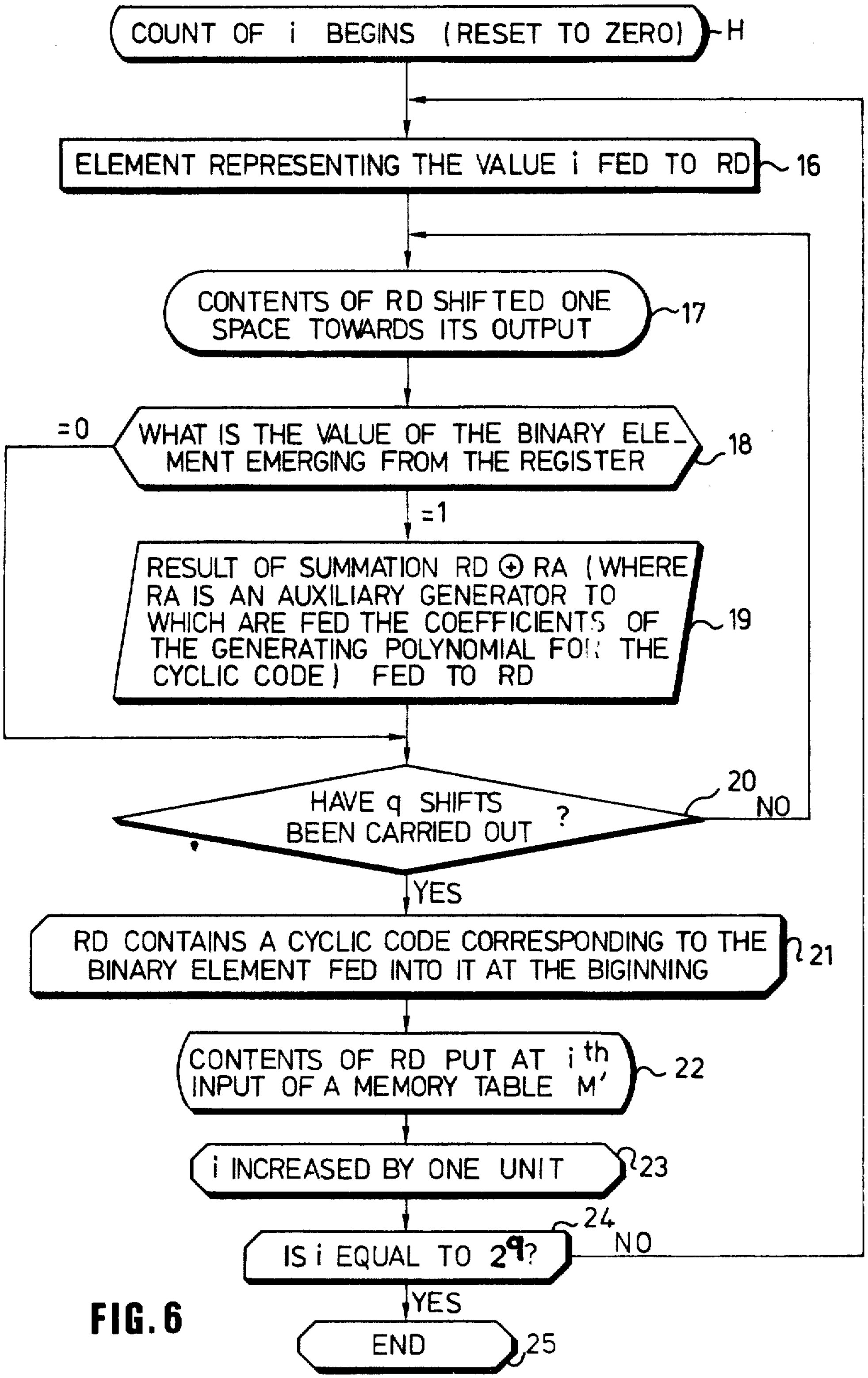
FIG. 6 illustrates the stages involved in generating the memory table shown in FIG. 4.

The method used to generate the table will now be described with reference to FIG. 6.

The first operation H is an operation to set the state of count to a value $i$ which corresponds to the position $i$ of the input to be calculated. This initial setting phase is followed by an operation 16 consisting of feeding into $R_D$ the binary elements representing value $i$, which is defined as follows:

$$O \leq i \leq 2^{q-1}$$

The next operation 17 consist in shifting the contents of register $R_D$ by one space towards its output, after which an operation 18 takes place which consists in checking the value of the binary element emerging from register $R_D$.

If the binary element emerging from the register is 1, an operation 19 is then carried out which consists in feeding to the shift register the binary elements resulting from an EXCLUSIVE OR summation between the previous contents of $R_D$ after the shift and the contents of an auxiliary register $R_A$, to which are fed binary elements representing the coefficients of the polynomial generating the cyclic code. Operation 20 consists in counting the number of shifts made by the contents of register $R_D$ up to this point. If $q$ shifts have yet to be made, the cycle of operations 16 to 20 is repeated in the same way. On the other hand, if $q$ shifts have been carried out, it can be stated at 21 that the shift register $R_D$ contains a cyclic code corresponding to the binary elements which it contained at the beginning, that is to say the cyclic code for the word represented by value $i$.

If on the other hand the binary element emerging from the shift register is O, operation 20 takes place immediately, this operation consisting in counting the number of shifts made by the content of register $R_D$ up to this point. As before, if $q$ shifts have yet to be carried out, the cycle of operations 16 to 20 is repeated in the same way until $q$ shifts have been made, after which it can be stated at 21 that the register $R_D$ contains a cyclic code corresponding to the binary elements which it contained at the beginning.

The following operation, 22, consists in storing the contents of $R_D$ at the $i^{th}$ input of a memory table M', from which it will be available for extraction at the appropriate time.

Operation 23 consists in increasing $i$ by 1 unit and operation 24 then consists in discovering whether the value $i = 2^q$ has been arrived at.

If the answer to question 24 is NO the cycle of operations 16 to 24 is repeated in the same way until all the inputs have been calculated.

If on the other hand the reply to question 24 is YES it can be stated at 25 that the process of filling up the memory table with the elements required to calculate the cyclic code of the message using the method in accordance with the second embodiment has been concluded.

Figure 7:
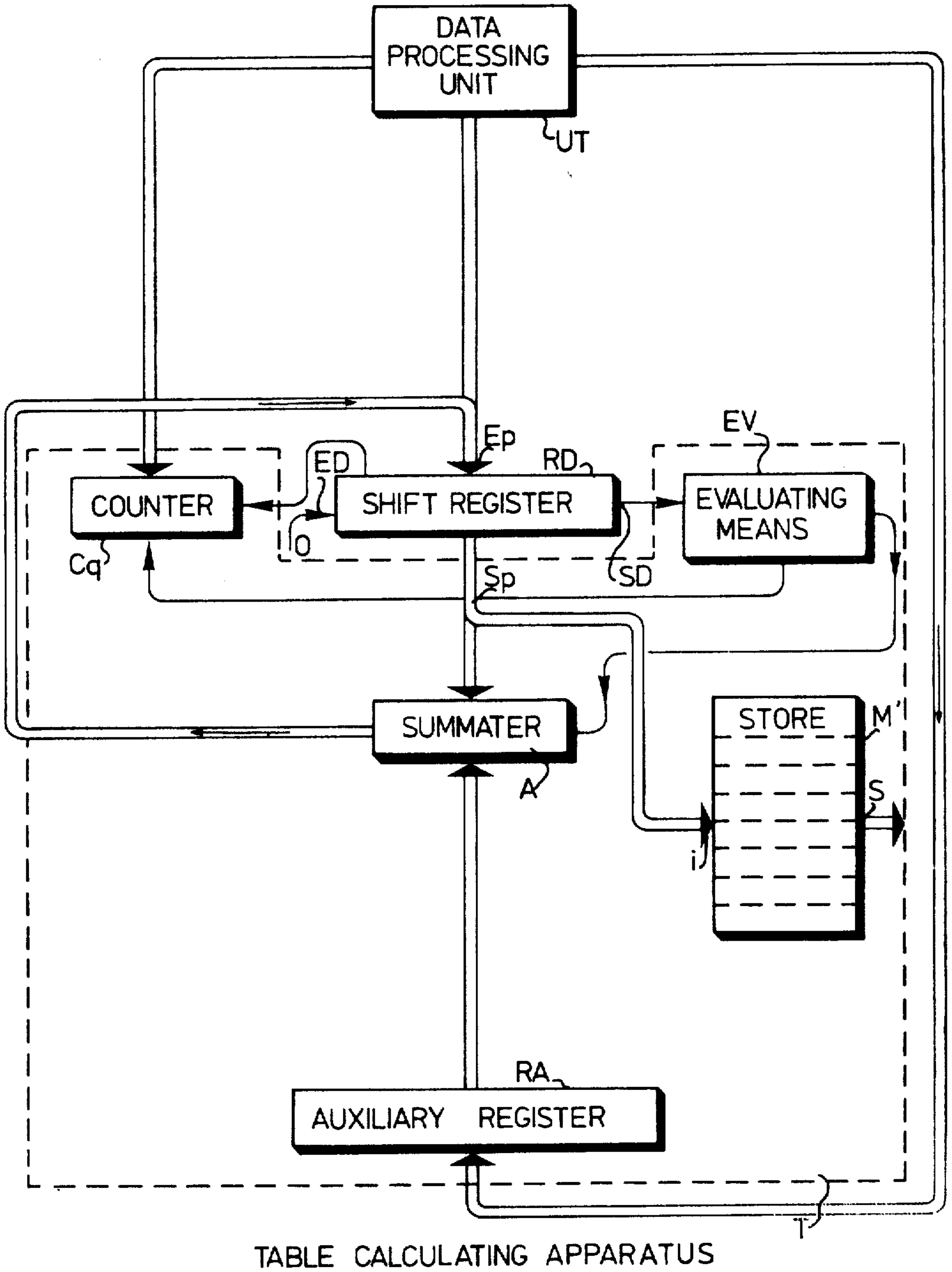
FIG. 7 is a diagram of the means employed to generate the table in FIG. 6.

The apparatus which enables the table to be calculated using the method just described is shown at T in FIG. 7.

In this Figure can be seen the data processing unit UT and the shift register $R_D$, which has parallel inputs $E_p$, parallel outputs $S_p$, a series shift input $E_D$ and a shift output $S_D$. At the beginning, the $q$ binary elements representing the value $i$ to be processed are fed to $R_D$. The means which enable $q$ successive shifts to be made by the contents of $R_D$ are formed by a counter $C_q$ which is controlled by processing unit UT and which is set to a value $q$ at the beginning of the process. This counter takes note of the shifts which are carried out after binary elements O are fed to input $E_D$ of the register $R_D$. The means of evaluation of the value of the binary element which emerges from register $R_D$ after each shift are represented by EV. These means supply a validating signal to the summater A when the binary element is equal to 1 and a block signal when the item in question is equal to O.

The apparatus also includes an auxiliary register $R_A$ to which the processing unit UT feeds binary elements representing the polynomial for generating the cyclic code. Adder A, which is of the EXCLUSIVE OR type, allows the binary elements resulting from summing the contents of this register and the contents of the auxiliary register $R_A$ to be fed back to register $R_D$. A new shift on the part of the contents of $R_D$ is then noted by counter $C_q$ which is actuated at this time by a signal, which may come from the evaluating means EV, for example after an interval which depends on the length of the summing operation. The various items of information contained in $R_D$ for each value of $i$ are stored at the corresponding $i$ inputs of a store M' whence they will be available for extraction via the S outputs of this store.

OPERATION OF THE PREFERRED EMBODIMENT

These methods and apparatus for calculating the cyclic codes of messages may be applied to the transmission of data in data-processing. The code is transmitted along the line after the message, and on reception, the same method or apparatus may be employed to decode it, provided that note is taken of the various shifts which take place not only in the number of binary elements in the message, but also in the number of binary check elements forming the cyclic code transmitted after the message. Also, zeros may be added as continuation of the message so that the number of binary elements in the complete message is a multiple of $q$. In this case the decoding operation does not involve any residue and is therefore simplified. In both cases the existence of a remainder which is not zero implies the existence of an error.

It is also possible, upon reception, to make a comparison between the check elements received and those elements recalculated simply on the basis of the $n$ binary information elements in the message received.

Any difference between these two values implies the existence of errors.

For ease of preparation, a distinction has been made between the means for calculating the cyclic code for the group of words and those for calculating the cyclic code for the group of words plus the residue, but these may be combined into a single apparatus which comes into operation at different times during the course of the operations which constitute the method, which further simplifies the calculating apparatus.

The first and second methods enable the cyclic codes of messages containing $n$ binary items to be calculated by splitting up the messages into a whole number s of words of $q$ binary elements no matter what the values of $n$ and $q$ are, and in particular when $n$ is not a multiple of $q$.

The second method employs a memory table which speeds up and simplifies the calculating operations since the table is calculated only once. This table is specific to a given code-generating polynomial and in particular it does not depend on the contents of the message to be transmitted.

It may be calculated at some time previous to the actual coding of the message, such as a time when the processing unit has little word to do.

It is clear that, in the cyclic code calculating method just described, any one operation could be replaced by an equivalent operation and that in the calculating apparatus the means employed could have been replaced by other means having the same technical function without exceeding the scope of the invention.

What is claimed is:

1. A method of obtaining the cyclic code of a message which contains $n$ binary information elements, said method comprising the steps of:

splitting up the message into a whole number $s$ of words each containing $q$ binary information elements plus a residue of $r$ binary information elements, in such a way that the relationship $n = sq + r$ is satisfied, $r$ being zero when $q$ is a sub-multiple of $n$, and $r$ being a whole number other than zero and less than $q$ when $q$ is not a sub-multiple of $n$, and producing the cyclic code of the message thus split up, said step comprising the substeps of:

enabling a calculating system to obtain word by word, the cyclic code of the group of words, said code being constructed and fed successively into a shift register, and checking the existence of said residue, the outcome of which is the delivery of either a negative check signal when there is no residue, the cyclic code of the message being then contained in said shift register, or a positive check signal when there is a residue, which causes an operation to commence which consists in obtaining from said calculating system the cyclic code for the group formed by said words and said residue, that is to say for the message, this cyclic code being fed into said shift register and being then contained in said shift register at the conclusion of this operation.

2. A method of calculating the cyclic code of a message according to claim 1, characterized in that said substep consists in obtaining word by word the cyclic code of the group of words takes place in the following sequence for each word:

performing a succession of $q$ shifts of the contents of said shift register towards its output, after each shift, performing an operation consisting in determining the value of the binary element emerging from the shift register, this element having a value of either 0 or 1, and the operation in question being carried out by evaluating means, where the emerging binary element is 1, performing a summing operation of the EXCLUSIVE OR type between the contents of said shift register and the contents of an auxiliary register to which are fed the binary elements representing the coefficients of a cyclic-code-generating polynomial, the binary elements resulting from this summation being fed back to said shift register, the contents of which undergo a further shift, where the emerging binary element is 0, shifting the contents of the shift register again and, after $q$ shifts, the register contains the cyclic code of said word, the sequence being repeated in the same way for the next word, the shift register having previously had fed to it the binary elements resulting from an EXCLUSIVE OR type summation between the cyclic code of said word and the $q$ binary elements representing said next word, the sequence being repeated $s$ times at the conclusion of which said shift register contains the cyclic code for the group of words.

3. A method of obtaining the cyclic code of a message according to claim 1, characterized in that said substep for obtaining the cyclic code of the group formed by said words and said residue comprises:

feeding to said shift register the binary elements resulting from an EXCLUSIVE OR type summation between the cyclic code for the group of words and the $r$ binary items representing said residue, performing a series of $r$ shifts of the contents of the shift register towards its output, after each of the shifts, performing an operation consisting in determining the value of the binary element emerging from the shift register, the value of this element being either 0 or 1 and the operation in question being carried out by means of evaluating means, when the emerging binary element is 1, performing a summing operation of the EXCLUSIVE OR type between the contents of the shift register and the contents of said auxiliary register, the binary elements resulting from this summation being fed back to said shift register the contents of which undergo a fresh shift, when the emerging binary element is 0, performing a fresh shift of the contents of the shift register, the register in question containing, after the $r$ shifts, the cyclic code for the group formed by said words and said residue.

4. A method of obtaining the cyclic code of a message according to claim 1, characterized in that said substep consisting in obtaining word by word the cyclic code for the group of words comprises the following succession of operations:

reading out from a memory table, at the $J^{th}$ input of this table, the cyclic code of the word formed by the binary elements contained in the shift register at its output end, which represent the value J, performing a shift of the contents of the shift register by $q$ spaces towards the output of said register for each word being processed, performing an EXCLUSIVE OR type summation between the new contents of said register after the shift and the contents of said memory table for the word in question, the operations being then repeated with the next word, said shift register having been fed beforehand with the binary elements resulting from an EXCLUSIVE OR type summation between the previous contents of said shift register and the $q$ binary elements representing said next word, these operations being repeated $s$ times, at the conclusion of which said shift register contains the cyclic code for said group of words.

5. A method of obtaining a cyclic code according to claim 1, characterized in that said operation consisting in calculating the cyclic code for the group formed by said words and the said residue comprises the following succession of substeps;

feeding into said shift register and into a temporary shift register the binary elements resulting from an EXCLUSIVE OR type summation between the cyclic code for the group of said words contained in the shift register and the $r$ binary elements representing said residue, shifting the contents of said shift register by $q - r$ units towards the input of the register, reading out from the $j^{th}$ input of a calculating memory table the cyclic code for the word formed by the $q$ binary elements contained in the shift register at its output end, while taking account of the residue $r$ arising from the preceding said summing operation, shifting the contents of the temporary register by $r$ units towards the output of the register, performing an EXCLUSIVE OR type summation between this final content of the temporary register and the binary elements forming the cyclic code supplied by said table, the binary elements resulting from this summing operation representing the cyclic code for the group formed by said words and said residue and being fed back to the shift register.

6. A method of obtaining the cyclic code of a message according to claim 4 characterized in that said table from which is read the cyclic code corresponding to the $q$ binary elements contained in the shift register at its output end, is produced by means of the following operations:

performing an initial setting operation to the value $i$, one value of i corresponding to each input to the table, feeding the binary elements representing the value i to the shift register to allow the $i^{th}$ input of the table to be calculated, i being defined as follows:

$$O \leq i \leq 2^{q-1}$$

performing a succession of $q$ shifts of the word contained in said shift register towards its output:

after each of the shifts, performing an operation consisting in determining the value of the binary element emerging from the shift register, the value of which may be either 0 or 1, where the emerging binary element is 1, performing an EXCLUSIVE OR type summation is undertaken between the contents of the shift register and the contents of an auxiliary register which contains the binary elements representing the coefficients of the polynomial for generating the cyclic code, the binary elements resulting from this summation being fed back to said shift register, the contents of which undergo a new shift, where the emerging binary element is 0, shifting the contents of said shift register again, the register containing, after $q$ of said shifts, the cyclic code for the word which it contained at the beginning this code being stored at the $i^{th}$ input of the memory table, the operations being repeated in the same way with the next value i+1 until all $2^q$ inputs have been calculated.

7. An apparatus for obtaining the cyclic code of a message containing $n$ binary information elements which employs the method according to claim 1 and which comprises:

means for splitting up the message into a whole number $s$ of words each of which contains $q$ binary information elements and a residue $r$ of binary information elements such that the relationship $n = sq + r$ is satisfied, $r$ being zero when $q$ is a sub-multiple of $n$, and $r$ being a whole number other than zero and less than $q$ when $g$ is not a sub-multiple of $n$, a shift register into which the code for the message is fed, calculating means connected to the outputs of said splitting means and to the outputs and inputs of said shift register which enable the cyclic code for said split-up message to be calculated and fed successively into said shift register, said apparatus being characterized in that said calculating means comprise:

a first system for calculating word by word, the cyclic code of the group of said words, this first system being connected at its input to the outputs of the shift register and to the outputs of the splitting means and at its outputs to the inputs of said shift register, means which enable the existence of said residue to be checked, these checking means being connected to said splitting means and supplying a signal when there is a residue, said signal operating a second system for calculating the cyclic code of the group formed by said words and the residue, which second system being connected at its input to the outputs of said splitting means and to the outputs of said shift register and at its outputs to the inputs of said shift register.

8. An apparatus for obtaining the cyclic code of a message according to claim 7, characterized in that said system for calculating word by word the cyclic code of the group of words in the message comprises:

means for subjecting the contents of said shift register to $q$ shifts towards its output, first means for evaluating the value of the binary element emerging from said shift register, the value of this element being either 0 or 1, these evaluating means coming into operation each time a shift occurs and supplying a validating signal if said emerging element is 1 and an invalidating signal if said emerging element is 0, an auxiliary register into which are fed the binary elements representing the coefficients of the polynomial for generating the cyclic code, a first summing member of the EXCLUSIVE OR type, one terminal of which is connected to the outputs of said shift register and another terminal of which is connected to the outputs of said auxiliary register, said summing member having its outputs connected to the inputs of said shift register such that, when said evaluating means supply validating signal, said shift register has fed to it the binary elements resulting from the EXCLUSIVE OR type summation between the contents of said shift register and the contents of said auxiliary register before a new shift takes place, and such that there is an immediate shift of the contents of said shift register when said evaluating means supply an invalidating signal, a second summing member of the EXCLUSIVE OR type, one terminal of which is connected to the outputs of said shift register and another terminal of which is connected to the outputs of said splitting means, said second summater having its outputs connected to the inputs of the shift register and receiving a validating signal at the beginning of each word, such that said shift register has fed to it the binary elements resulting from an EXCLUSIVE OR type summation between the binary elements representing said word and the binary elements forming the cyclic code for the preceding word.

9. An apparatus for obtaining the cyclic code of a message according to claim 7, characterized in that said system for calculating the cyclic code of the group formed by said words and said residue comprises:

a third summing member of the EXCLUSIVE OR type, one terminal of which is connected to the outputs of the shift register and another terminal of which is connected to the outputs of said reading means, said third summater being validated after the cyclic code for the group of s words in the message has been calculated, so as to allow the binary elements resulting from an EXCLUSIVE OR type summation between the binary elements representing the cyclic code for said group of words and the binary elements representing said residue to be fed into the shift register, means to subject the contents of the shift register to $r$ shifts towards its output, second means for evaluating the value of the binary element emerging from the shift register, the value of this element being either 0 or 1, the second evaluating means coming into operation each time a shift takes place and supplying a validating signal when said emerging binary element is equal to 1 and an invalidating signal when said emerging element is equal to 0, an auxiliary register into which are fed the binary elements representing the coefficients of the generating polynomial for the cyclic code, and a fourth summing member of the EXCLUSIVE OR type, one terminal of which is connected to the outputs of said shift register and another terminal of which is connected to the outputs of said auxiliary register, said summing member having its outputs connected to the inputs of the shift register such that, when said evaluating means supply a validating signal, the binary elements resulting from the EXCLUSIVE OR type summation between the contents of said shift register and the contents of said auxiliary register prior to a fresh shift are fed to the shift register, and such that the contents of said register are immediately shifted when said second evaluating means supply an invalidating signal, said shift register containing, after $r$ shifts, the cyclic code for the group formed by said words and said residue.

10. An apparatus for obtaining the cyclic code of a message according to claim 7, characterized in that said system for calculating word by word the cyclic code of the group of words in the message comprises:

a calculation memory table connected to the outputs of the shift register in which the cyclic codes for all the words of q binary items which may be present in the shift register at its output end have been calculated and stored beforehand, means to shift the contents of the shift register by $q$ units towards its output, in the case of each word, a first summing member of the EXCLUSIVE OR type one terminal of which is connected to the outputs of the shift register and another terminal of which is connected to the outputs of the calculation memory table and which allows a first EXCLUSIVE OR type summation to be carried out between the contents of the register after the shift by $q$ units and the binary elements representing the cyclic code, which are delivered by the table and relate to the word being processed, the result of this summation being fed back to the shift register, and a second summing member of the EXCLUSIVE OR type, one terminal of which is connected to the outputs of said reading and splitting member and another terminal of which is connected to the outputs of said shift register and which allows the binary elements resulting from a second EXCLUSIVE OR type summation between the binary elements obtained after the first summation and the binary elements representing the word following the word being processed to be fed back to the shift register, said shift register containing the cyclic code of the group of words when the summing members have been validated $s$ times, the last validating bringing into operation said means for checking for the existence of the residue.

11. An apparatus for obtaining the cyclic code of a message according to claim 7, characterized in that said system for calculating the cyclic code for the group formed by the said words and said residue comprises:

a third summing member of the EXCLUSIVE OR type one terminal of which is connected to the outputs of the shift register and another terminal of which is connected to the outputs of said reading and splitting means, the outputs of this third summing member being connected to the inputs of the shift register in such a way that the binary elements resulting from an EXCLUSIVE OR summation between the binary elements representing the cyclic code for said words contained in the shift register and the $r$ binary elements representing said residue is fed back to the shift register, a temporary register connection to the outputs of this third summing member into which are fed the binary elements resulting from the foregoing addition, means to subject the contents of the shift register to $q - r$ shifts toward its input, a calculation memory table connected to the outputs of the shift register, the $j^{th}$ input of which contains the cyclic code for the $q$ binary elements contained in the shift register at its output end, these $q$ binary elements being related to said residue by the previous summation, means to subject the contents of the temporary register to $r$ shifts towards its output, and a fourth summing member of the EXCLUSIVE OR type which is connected on the one hand to the outputs of said temporary register and on the other hand to an output of the calculation table which corresponds to its $j^{th}$ input, the outputs of this fourth summater being connected to the inputs of the shift register in such a way that the binary elements representing the cyclic code for the group formed by said words and said residue are fed to this register.

12. An apparatus for obtaining the cyclic code of a message according to claim 10, characterized in that said table, which allows the cyclic codes appropriate to each of the values of $i$ fed successively to the shift register at its output end in successive groups of $q$ binary elements to be calculated and stored, comprises:

means which, for each value of $i$, allows $q$ successive shifts to be made by the contents of the shift register, means for checking the value of the binary element emerging from said register each time one of the $q$ shifts takes place, the value of this binary element being 0 or 1, the check means supplying a validation signal when the emerging binary element is equal to 1 and an invalidating signal when the binary element in question is equal to 0, an auxiliary register to which are fed the binary elements representing the coefficients of the generating polynomial for the cyclic code, a summing member of the EXCLUSIVE OR type which is connected on the one hand to the outputs of said shift register and on the other hand to the outputs of said auxiliary register and the outputs of which are connected to the inputs of said shift register, in such a way that, when this summing member receives a validating signal, the binary elements resulting from an EXCLUSIVE OR type summation between the contents of this register and the contents of said auxiliary register are fed back to the shift register prior to any new shift, and such that an immediate shift of the contents of the shift register is carried out without any summation operation when said summater receives an invalidating signal, the shift register containing, after $q$ shifting operations, a cyclic code representing its initial contents, and a store in which are stored, at appropriate inputs, the cyclic codes thus obtained for each value of $i$.

* * * * *

UNITED STATES PATENT OFFICE

CERTIFICATE OF CORRECTION

PATENT NO. : 3,893,078

DATED : July 1, 1975

INVENTOR(S) : Jean Maurice Finet

It is certified that error appears in the above-identified patent and that said Letters Patent are hereby corrected as shown below:

Claim 7, line 53, delete "g" and substitute therefor --q--.

Claim 7, line 7, delete "input" and substitute therefor --inputs--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*